US 6,527,006 B2

(12) United States Patent
Jackson

(10) Patent No.: US 6,527,006 B2
(45) Date of Patent: Mar. 4, 2003

(54) EXHAUST VALVE ASSEMBLY

(75) Inventor: Benjamin Elliott Jackson, Columbus, IN (US)

(73) Assignee: Arvinmeritor, Inc., Troy, MI (US)

( * ) Notice: Subject to any disclaimer, the term of this patent is extended or adjusted under 35 U.S.C. 154(b) by 0 days.

(21) Appl. No.: 09/897,372

(22) Filed: Jul. 2, 2001

(65) Prior Publication Data

US 2003/0000582 A1 Jan. 2, 2003

(51) Int. Cl.[7] ............................................... F16K 15/03
(52) U.S. Cl. ........................ 137/527.6; 137/535; 251/65; 251/337
(58) Field of Search ...................... 137/527, 527.6, 137/535; 251/65, 337; 454/5, 359; 60/324; 181/278

(56) References Cited

U.S. PATENT DOCUMENTS

| 1,483,354 | A | * | 2/1924 | Kopper, Jr. ................. 60/324 |
| 2,174,332 | A | * | 9/1939 | Schweighart ............ 137/527.6 |
| 2,515,425 | A | * | 7/1950 | Restemeier ................. 137/527 |
| 3,541,945 | A | * | 11/1970 | Wexler ........................ 251/65 |
| 3,665,958 | A | * | 5/1972 | Dunkelis ..................... 251/65 |
| 3,788,072 | A | | 1/1974 | Burger ......................... 60/324 |
| 3,923,120 | A | | 12/1975 | Jatcko ......................... 181/60 |
| 4,012,058 | A | | 3/1977 | Patton ........................... 285/9 |
| 4,495,859 | A | | 1/1985 | Janke et al. |
| 4,727,796 | A | | 3/1988 | Derkach |
| 4,821,629 | A | | 4/1989 | Davison et al. |
| 5,096,230 | A | | 3/1992 | Pausch et al. ............... 285/9.1 |
| 5,127,874 | A | | 7/1992 | Wiles ............................. 454/7 |
| 5,355,673 | A | * | 10/1994 | Sterling et al. ............... 60/324 |
| 5,603,214 | A | * | 2/1997 | Abels et al. .................. 60/324 |
| 5,716,271 | A | * | 2/1998 | Paidosh .................... 137/527.8 |
| 6,006,859 | A | | 12/1999 | Hussaini ..................... 181/227 |
| 6,141,961 | A | | 11/2000 | Rinckel ....................... 60/288 |
| 6,240,957 | B1 | * | 6/2001 | Hattori ..................... 137/527.6 |

* cited by examiner

Primary Examiner—John Rivell
(74) Attorney, Agent, or Firm—Barnes & Thornburg

(57) ABSTRACT

An exhaust valve assembly for controlling the flow of exhaust comprising a hollow elongated member, desirably in the form of an exhaust pipe or component thereof, having an open end, a flap associated with the open end and a spring having two ends. The flap is pivotable between a first position to close the open end and a second position to open the open end, and is adapted to pivot toward the second position when the exhaust gas within the elongated member achieves a predetermined pressure. One end of the spring is associated with the flap and the other end of the spring is associated with the elongated member along the length of the elongated member. The spring biases the flap toward the first position. The spring desirably extends generally parallel to a longitudinal axis of the elongated member when the flap is in the first position. The flap desirably includes a lateral edge having a hook and the one end of the spring is mounted to the hook. The exhaust valve assembly further includes a magnet associated with the open end of the elongated member for biasing the flap toward the first position when the pressure of exhaust gas within the elongated member is less than the predetermined pressure.

21 Claims, 2 Drawing Sheets

EXHAUST VALVE ASSEMBLY

BACKGROUND AND SUMMARY OF THE INVENTION

The present invention relates to an exhaust valve assembly and, more particularly, to an exhaust valve assembly for controlling the flow of exhaust gases therethrough.

Important considerations in the design of exhaust systems include the muffling of sound, and engine performance. At lower engine RPM, such as occurs at idle or cruising speed, it typically is desirable to have a higher back pressure in the exhaust system to help muffle the exhaust sound and create a quieter exhaust. At higher RPM, when engine performance is desired, it typically is desirable to have lower back pressure in the exhaust system to obtain higher horsepower engine performance. At higher RPM, though, the increased exhaust flow triggers the exhaust valve to open, which reduces back pressure.

Many efforts have been made in the design of exhaust systems to address these important considerations. One known exhaust valve system that has been relatively successful in the marketplace, for example, uses a hinged flap and a linear torsion spring that connects the flap to the exhaust pipe and extends across the open end of the exhaust tube. The spring exerts a closing force on the flap that increases as the valve opens. A drawback of this and other known systems is that the closing force exerted on the flap increases substantially as the flap opens which tends to increase back pressure.

It is an object of the present invention to provide an exhaust valve system having a flap that opens once the engine reaches a predetermined RPM.

It is a further object of the present invention to provide an exhaust valve system that applies a closing force on the flap that increases in magnitude at a non-linear rate as the flap opens.

It is another object of the present invention to provide an exhaust valve system that uses a linear spring to apply a non-linear closing force on the flap.

In accordance with these and other objects, the present invention provides an exhaust valve assembly for controlling the flow of exhaust. The exhaust valve assembly comprises a hollow elongated member, desirably in the form of an exhaust pipe or component thereof, for the flow of gas therethrough. The hollow elongated member has an open end, and the exhaust valve assembly further comprises a flap associated with the open end and a spring having two ends. The flap is pivotable between a first position to close the open end and a second position to open the open end, and is adapted to pivot toward the second position when the exhaust gas within the elongated member achieves a predetermined pressure. One end of the spring is associated with the flap and the other end of the spring is associated with the elongated member along the length of the elongated member. The spring biases the flap toward the first position. The spring desirably extends generally parallel to a longitudinal axis of the elongated member when the flap is in the first position. The flap desirably includes a lateral edge having a hook and the one end of the spring is mounted to the hook.

In a preferred embodiment, the exhaust valve assembly further includes a magnet associated with the open end of the elongated member for biasing the flap toward the first position when the pressure of exhaust gas within the elongated member is less than a predetermined level. The magnet desirably prevents rattling of the flap and maintains the flap in a closed position at low exhaust gas pressure. Additionally, the flap may include an enclosing portion and a distal portion and the hollow elongated member may include a flange for engaging the distal portion when the flap is in the first position. The magnet desirably applies the biasing force to the distal portion. The spring may be a coil spring, a bent wire spring or any other type of spring.

In a preferred embodiment, the flap is hingedly connected to the elongated member in any suitable manner. For example, the elongated member may define a pair of holes to receive a stem that is rigidly mounted to the flap. Additionally, the elongated member desirably is a single piece extrusion.

Other objects, advantages and novel features of the present invention will become apparent from the following detail description of the drawings when considered in conjunction with the accompanying drawings.

DETAILED DESCRIPTION OF THE DRAWINGS

Figure 1:
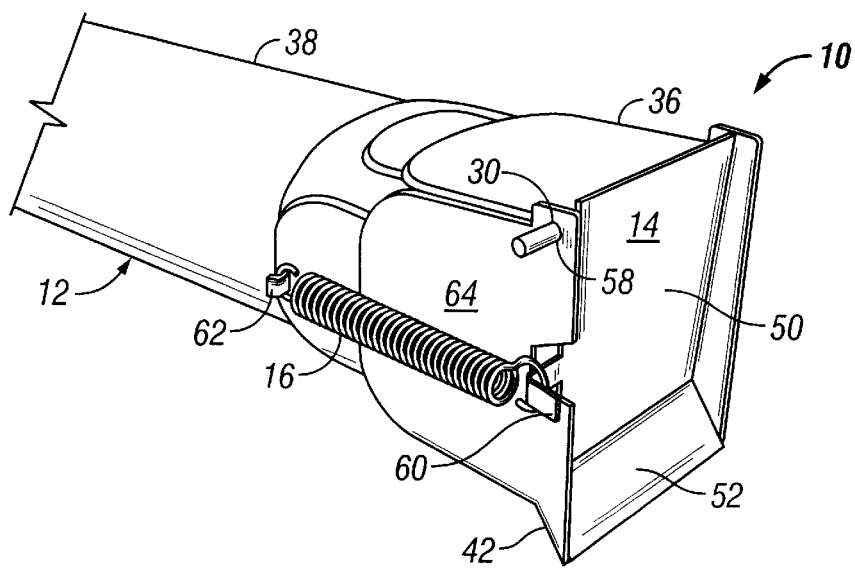
FIG. 1 is a broken perspective view of an exhaust valve assembly in accordance with a preferred embodiment of the invention.
Figure 2:
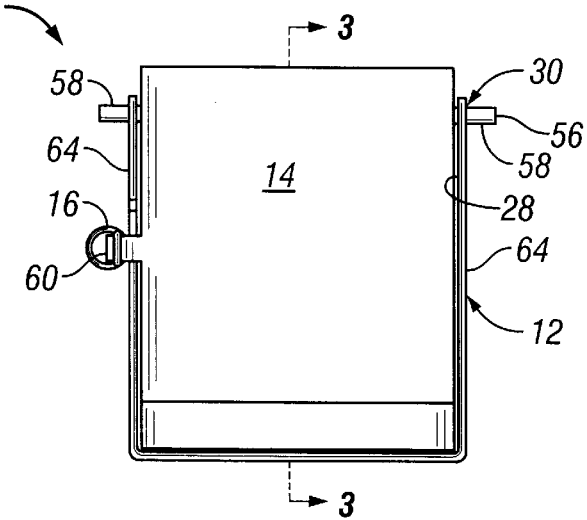
FIG. 2 is an end plan view of the exhaust valve assembly of FIG. 1.
Figure 3:
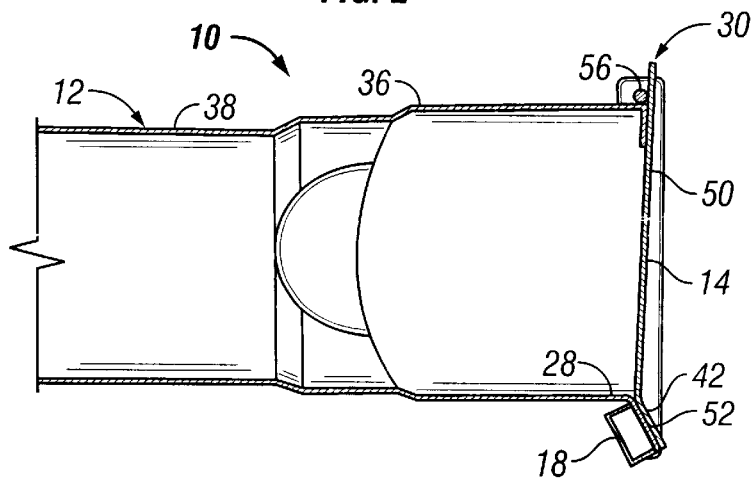
FIG. 3 is a cross section view taken along the lines 3—3 of FIG. 2.
Figure 4:
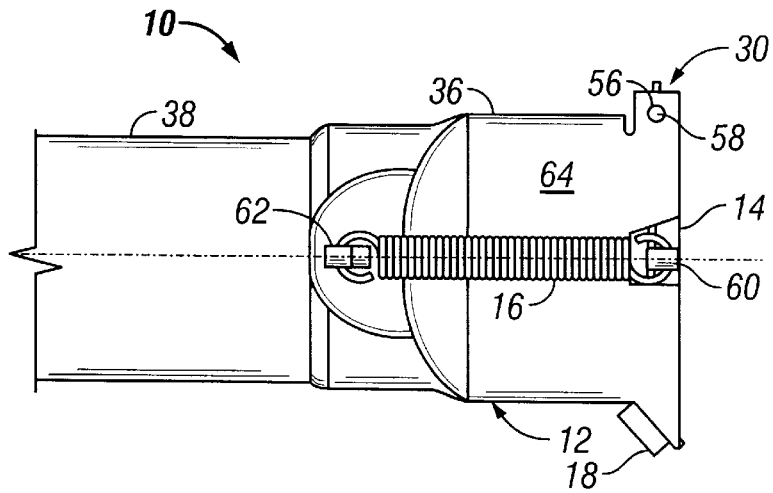
FIG. 4 is a side plan view of the exhaust valve assembly of FIG. 1.

FIGS. 1–5 illustrate an exhaust valve assembly 10 comprising a hollow tubular member in the form of an exhaust pipe 12, a flap 14 and a coil spring 16 for controlling the flow of exhaust gas through the exhaust pipe, and a magnet 18. The illustrated exhaust pipe 12 includes an open end 28, and the flap 14 is hingedly connected to the exhaust pipe by a hinge 30 such that the flap can pivot between a first position to substantially close the open end 28 (see e.g. FIGS. 1–4) and a second position to open the open end (see e.g. FIG. 5). In the illustrated embodiment, the magnet 18 is mounted to the exhaust pipe 12 opposite the hinge 30 to bias the flap 14 towards the first position at low exhaust gas pressure desirably to prevent rattling of the exhaust pipe or keep the flap completely closed at low exhaust gas pressure.

The exhaust pipe 12 may have any suitable construction. In the illustrated embodiment, for example, the exhaust pipe 12 is a single-piece metal extrusion and has a leading portion 36 having a generally rectangular cross section, and a tail portion 38 having a generally circular cross section. The open end 28 of the exhaust pipe is generally rectangular and includes a flange 42.

The magnet 18 may have any suitable construction and desirably is mounted on a rear side of the flange 42 in any suitable manner. The magnet 18 may, for example, be in the form of an aluminum-nickel-cobalt magnet sold by Magnetic Component Engineering, Inc. of Torrance, Calif. The magnet 18 may, for example, be secured to the exhaust pipe 12 by a ceramic adhesive or any other suitable adhesive or may be welded to the exhaust pipe.

The flap 14 may have any suitable construction that desirably complements the configuration of the open end 28 of the exhaust pipe 12. In the illustrated embodiment, for example, the flap 14 includes a rectangular enclosing portion 50 to close the open end 28 and a rectangular distal portion 52 that contacts or otherwise engages the flange 42 when the flap 14 is in the closed position. The distal portion 52 extends outward from the enclosing portion 50 at a slight angle relative to the enclosing portion to complement the configuration of the flange 42.

The flap 14 may be secured to the exhaust pipe 12 in any suitable manner. In the illustrated embodiment, for example, the flap 14 is hingedly secured to the exhaust pipe 12 adjacent the open end 28 of the exhaust pipe. In this embodiment, the hinge 30 includes a stem 56 rigidly mounted to or otherwise associated with the flange, and a pair of holes 58 defined by the exhaust pipe 12 to permit pivoting of the flap 14 relative to the exhaust pipe.

The spring 16 may be secured to the flap 14 and the exhaust pipe 12 in any suitable manner. In the illustrated embodiment, for example, the spring 16 is mounted to a pair of hooks 60 and 62. The hook 60 is formed on the lateral edge of the flap 14 and the hook 62 is formed along the length of the exhaust pipe 12. The spring 16 may be secured to the exhaust pipe 12 and to the flap 14 in any other suitable manner in accordance with alternative embodiments of the invention. For example, one or both of the ends of the spring 16 may be welded thereto.

The spring 16 desirably extends substantially parallel to the longitudinal axis of the exhaust pipe 12 when the flap 14 is in the first position, and biases the flap to the first position. Because of the orientation of the spring 16, the biasing force is non-linear. In the illustrated embodiment, as the flap 14 opens, the biasing force desirably increases at a decreasing rate.

Accordingly, due to the biasing force of the spring 16, the flap 14 of the exhaust valve in accordance with a preferred embodiment stays in the first position when the pressure of the exhaust gas is low. When the pressure reaches a predetermined pressure, which desirably occurs when the engine reaches a predetermined RPM, the flap 14 begins to pivot towards the second position. Once the flap 14 begins to open, the biasing force applied by the spring 16 desirably increases at a decreasing rate.

Preferably, at low exhaust pressure, when the flap 14 is in the first position, the open end 28 is substantially closed. The magnet 18 desirably prevents rattling of the flap 14 and also closes any opening that otherwise may exist if the flap were instead hanging freely in the first position. The magnitude of the biasing force of the magnet 18, however, may be relatively insignificant as compared to the biasing force of the spring 16 in that once the flap 14 opens due to the increased exhaust pressure, the biasing force of the magnet has little or no effect on the pivoting of the flap until the flap returns to the first or substantially closed position.

Additionally, if desired, the exhaust pipe 12 can include any suitable structure for centering the flap 14 between opposed side walls 64 of the exhaust pipe when the flap is in the closed position. For example, the exhaust pipe 12 may define a cavity (not shown) for receiving the lateral edges of the flap 14 to guide the flap to a center position. If desired, the cavity may, for instance, be defined by a pair of indentations or ribs (not shown) on the inner sides of opposed walls 64. Desirably, such ribs or indentations are adjacent to hinge 30 and extend only a portion of the length of the opposed walls 64.

If desired, the hinge 30 may further include a pair of wire mesh bushings (not shown) received within holes 58 for engaging the stem 46 and the exhaust pipe 12. The wire mesh bushings may be used, for example, to accommodate the expansion of the exhaust pipe 12 at elevated temperatures and reduce binding of the stem 56 within the holes 58. The wire mesh bushings may, for example, be constructed of 304 SS (stainless steel) wire spun to about 50% density.

Figure 5:
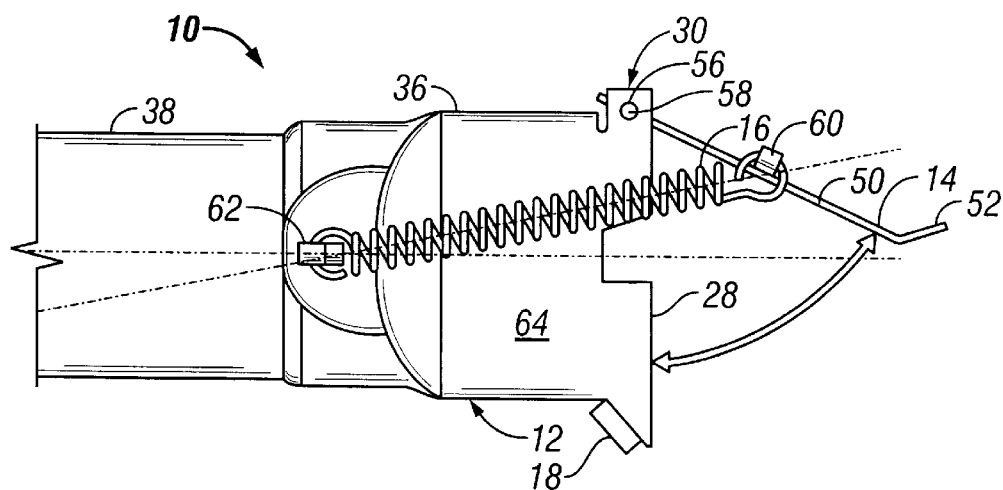
FIG. 5 is a side plan view of the exhaust valve assembly of FIG. 1, illustrating the flap pivoted to an open position and illustrating with arrows the direction of pivoting of the flap.
Figure 6:
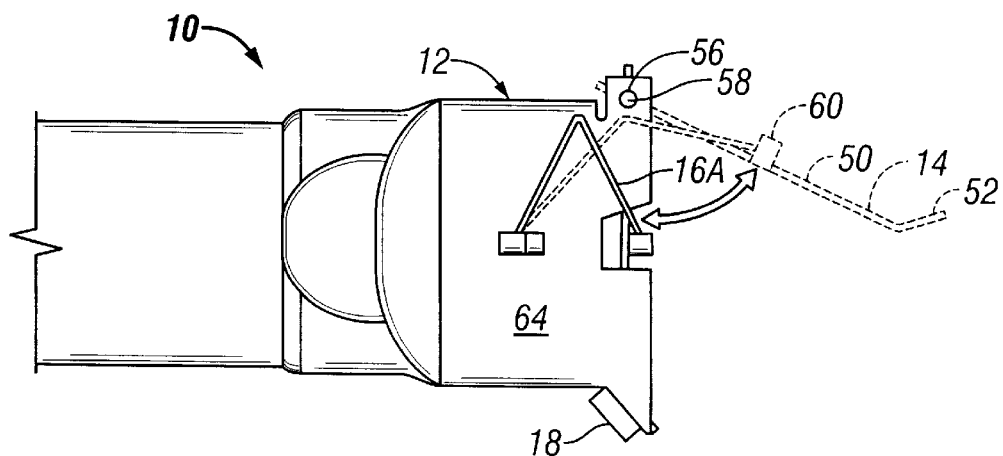
FIG. 6 is a side plan view of an exhaust valve assembly in accordance with an alternative embodiment of the invention including a bent wire spring, illustrating with dashed lines the flap pivoted to an open position and illustrating with arrows the direction of pivoting of the flap.

In accordance with alternative embodiments, the spring 16 may have any other suitable construction that desirably applies a non-linear biasing force on the flap. FIG. 5, for example, illustrates a spring in the form of a bent wire spring 16a.

Although the invention has been described and illustrated in detail with reference to preferred embodiments, it is to be clearly understood that the same is by way of illustration and example only, and is not to be taken by way of limitation. The spirit and scope of the present invention are to be limited only by terms of the appended claims.

The claimed invention is:

1. An exhaust valve assembly for controlling the flow of exhaust gas, the exhaust valve assembly comprising:
    (a) a hollow elongated member for the flow of exhaust gas therethrough, the elongated member having an open end;
    (b) a flap associated with the open end and pivotable between a first position to close the open end and a second position to open the open end, the flap adapted to pivot toward the second position when the exhaust gas within the elongated member achieves a predetermined pressure; and
    (c) a spring external to the elongated member having two ends, one end secured to the flap and the other end secured to the elongated member along the length of the elongated member proximal of the flap, the spring applying a tension force biasing the flap toward the first position.

2. An exhaust valve assembly for controlling the flow of exhaust gas, the exhaust valve assembly comprising:
    (a) a hollow elongated member for the flow of exhaust gas therethrough, the elongated member having an open end;
    (b) a flap associated with the open end and pivotable between a first position to close the open end and a second position to open the open end, the flap adapted to pivot toward the second position when the exhaust gas within the elongated member achieves a predetermined pressure; and
    (c) a spring having two ends, one end associated with the flap and the other end associated with the elongated member along the length of the elongated member, the spring biasing the flap toward the first position; wherein the spring extends generally parallel to a longitudinal axis of the elongated member when the flap is in the first position.

3. The exhaust valve assembly of claim 2 further including a magnet associated with the open end of the elongated member for biasing the flap toward the first position when the pressure of exhaust gas within the elongated member is less than the predetermined pressure.

4. The exhaust valve assembly of claim 2 further including a stem connecting the flap to the elongated member to facilitate pivoting of the flap.

5. The exhaust valve assembly of claim 2 wherein the elongated member includes a hook, the other end of the spring mounted to the hook.

6. The exhaust valve assembly of claim 2 wherein the spring is a coil spring.

7. The exhaust valve assembly of claim 2 wherein the spring is a bent wire spring.

8. An exhaust valve assembly for controlling the flow of exhaust gas, the exhaust valve assembly comprising:
   (a) a hollow elongated member for the flow of exhaust gas therethrough, the elongated member having an open end;
   (b) a flap associated with the open end and pivotable between a first position to close the open end and a second position to open the open end, the flap adapted to pivot toward the second position when the exhaust gas within the elongated member achieves a predetermined pressure; and
   (c) a spring having two ends, one end associated with the flap and the other end associated with the elongated member along the length of the elongated member, the spring biasing the flap toward the first position; wherein the spring extends generally parallel to a longitudinal axis of the elongated member when the flap is in the first position and wherein the flap includes a lateral edge, the one end of the spring being mounted to the lateral edge.

9. The exhaust valve assembly of claim 8 wherein the lateral edge includes a hook, the one end of the spring mounted to the hook.

10. An exhaust valve assembly for controlling the flow of exhaust gas, the exhaust valve assembly comprising:
    (a) a hollow elongated member for the flow of exhaust gas therethrough, the elongated member having an open end;
    (b) a flap associated with the open end and pivotable between a first position to close the open end and a second position to open the open end, the flap adapted to pivot toward the second position when the exhaust gas within the elongated member achieves a predetermined pressure; and
    (c) a spring having two ends, one end associated with the flap and the other end associated with the elongated member along the length of the elongated member, the spring biasing the flap toward the first position;
    wherein the flap includes an enclosing portion and a distal portion and the hollow elongated member includes a flange for engaging the distal portion when the flap is in the first position.

11. The exhaust valve assembly of claim 10 further including a magnet associated with the flange for applying a biasing force to the distal portion to bias the flap toward the first position when the pressure of exhaust gas within the elongated member is less than the predetermined pressure.

12. The exhaust valve assembly of claim 11 wherein the open end is generally rectangular and the enclosing portion is generally rectangular.

13. The exhaust valve assembly of claim 12 wherein the enclosing portion includes a lateral edge, the one end of the spring being associated with the lateral edge.

14. The exhaust valve assembly of claim 13 wherein the one end of the spring is mounted to the lateral edge adjacent a middle of the lateral edge, and the spring extends generally parallel to a longitudinal axis of the elongated member when the flap is in the first position.

15. The exhaust valve assembly of claim 14 wherein the lateral edge includes a hook, the one end of the spring mounted to the hook.

16. An exhaust valve assembly for controlling the flow of exhaust gas, the exhaust valve assembly comprising:
    (a) a hollow elongated member for the flow of exhaust gas therethrough, the elongated member having a longitudinal axis and an open end;
    (b) a flap associated with the open end, the flap hingedly connected to the elongated member adjacent the open end and adapted to pivot between a first position to close the open end and a second position to open the open end when the exhaust gas within the elongated member achieves a predetermined pressure; and
    (c) a spring having two ends, one end associated with the flap and the other end associated with the hollow elongated member along the length of the hollow elongated member, the spring biasing the flap toward the first position and extending generally parallel to the longitudinal axis of the hollow elongated member when the flap is in the first position.

17. The exhaust valve assembly of claim 16 further including a magnet associated with the open end of the hollow elongated member and wherein the flap includes a distal portion, the magnet for applying a biasing force to the distal portion to bias the flap toward the first position when the pressure of exhaust gas within the elongated member is less than the predetermined pressure.

18. The exhaust valve assembly of claim 17 wherein the flap includes a lateral edge having a hook, the one end of the spring mounted to the hook.

19. An exhaust valve assembly for controlling the flow of exhaust gas, the exhaust valve assembly comprising:
    (a) a hollow elongated member for the flow of exhaust gas therethrough, the elongated member having a longitudinal axis and an open end;
    (b) a flap associated with the open end, the flap hingedly connected to the elongated member adjacent the open end and adapted to pivot between a first position to close the open end and a second position to open the open end when the exhaust gas within the elongated member achieves a predetermined pressure;
    (c) a spring having two ends, one end associated with the flap and the other end associated with the hollow elongated member along the length of the hollow elongated member, the spring biasing the flap toward the first position and extending generally parallel to the longitudinal axis of the hollow elongated member when the flap is in the first position; and
    (d) a magnet associated with the open end of the hollow elongated member for biasing the flap toward the first position when the pressure of exhaust gas within the elongated member is less than the predetermined pressure.

20. An exhaust valve assembly for controlling the flow of exhaust gas, the exhaust valve assembly comprising:
    (a) a hollow elongated member for the flow of exhaust gas therethrough, the elongated member having a longitudinal axis and an open end;
    (b) a flap associated with the open end, adapted to pivot between a first position to close the open end and a second position to open the open end when the exhaust gas within the elongated member achieves a predetermined pressure;
    (c) a magnet associated with the open end of the hollow elongated member for biasing the flap toward the first position when the pressure of exhaust gas within the elongated member is less than the predetermined pressure; and (d) a spring external to the elongated member having two ends, one end secured to the flap and the other end secured to the hollow elongated member proximal to the flap, the spring biasing the flap toward the first position.

21. An exhaust valve assembly for controlling the flow of exhaust gas, the exhaust valve assembly comprising:

(d) a hollow elongated member for the flow of exhaust gas therethrough, the elongated member having an open end;

(e) a flap pivotally secured to the hollow elongate member adjacent the open end to define a pivot axis, the flap pivotable between a first position to close the open end and a second position to open the open end, the flap adapted to pivot toward the second position when the exhaust gas within the elongated member achieves a predetermined pressure; and (f) a spring external to the elongated member having two ends, one end associated with the flap and the other end secured to the elongated member along the length of the elongated member, the spring extending non-coincident to the pivot axis, the spring biasing the flap toward the first position.

\* \* \* \* \*